May 1, 1956  A. G. DEAN ET AL  2,743,680
MOUNTING FOR GENERATOR ON RAILWAY CAR TRUCK
Filed May 18, 1953  2 Sheets-Sheet 1
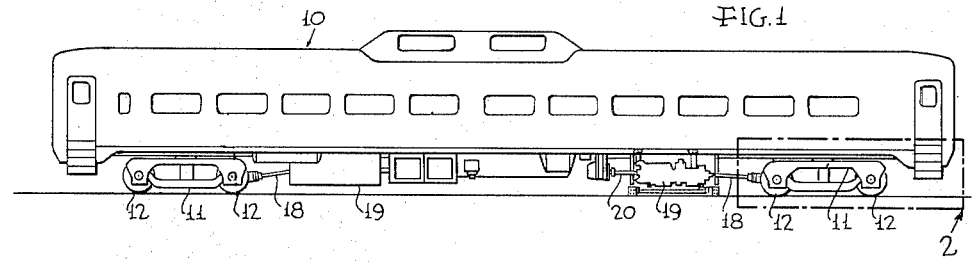
FIG. 1
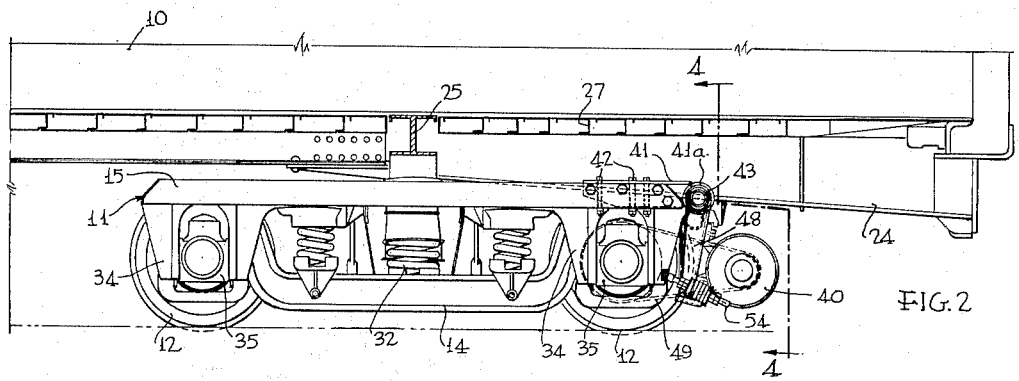
FIG. 2
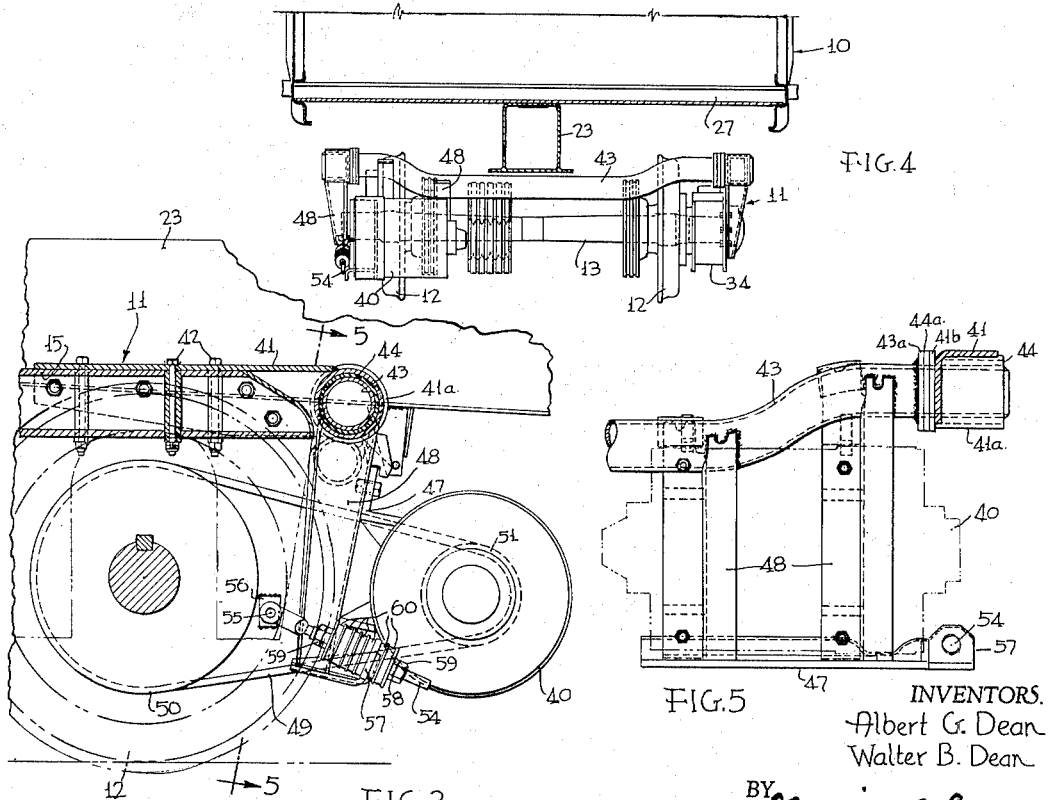
FIG. 4
FIG. 3
FIG. 5
INVENTORS.
Albert G. Dean
Walter B. Dean
BY Maurice A. Crews
ATTORNEY May 1, 1956   A. G. DEAN ET AL   2,743,680
MOUNTING FOR GENERATOR ON RAILWAY CAR TRUCK
Filed May 18, 1953   2 Sheets-Sheet 2
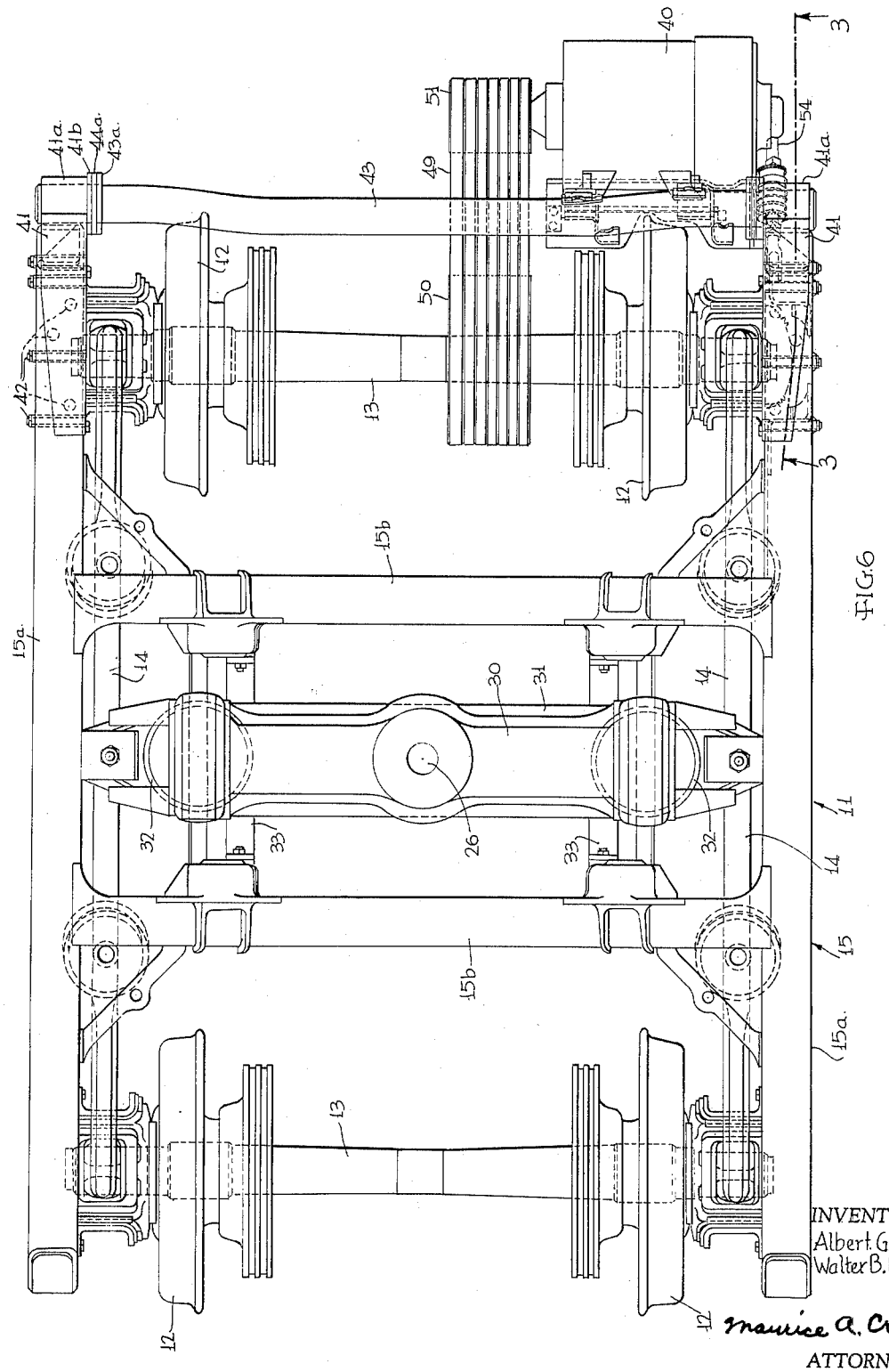
INVENTORS.
Albert G. Dean
Walter B. Dean
Maurice A. Crews
ATTORNEY United States Patent Office 2,743,680
Patented May 1, 1956

2,743,680

MOUNTING FOR GENERATOR ON RAILWAY CAR TRUCK

Albert G. Dean and Walter B. Dean, Narberth, Pa., assignors to The Budd Company, Philadelphia, Pa., a corporation of Pennsylvania Application May 18, 1953, Serial No. 355,658

4 Claims. (Cl. 105—106)

This invention relates to a mounting for a generator on a railway car truck and has for an object the provision of improvements in this art. The mounting provides for driving the generator by a belt from the wheel axle of the truck and includes resilient means for keeping the belt tight and also includes a resilient support for the generator to avoid injury by rail pounding in service and to avoid injury to the truck frame on account of the mounting of the generator thereon.

The generator is mounted on the truck of a motor driven rail car such as that now widely known as the "Rail Diesel Car," abbreviated as "RDC," wherein the space beneath the floor between the trucks is so completely taken by other apparatus that available space for an axle-driven generator can be found only at the outboard ends of the trucks.

The car on which the present generator mounting has been used is shown in the copending application of Walter B. Dean, Serial Number 152,861, filed March 30, 1950, now Patent No. 2,667,843; the underframing of the car is shown in the copending application of Albert G. Dean, Serial Number 138,140, filed January 12, 1950, now Patent No. 2,646,009; the wheel truck of the car is shown in the copending application of Walter B. Dean and Albert G. Dean, Serial Number 135,972, filed December 30, 1949, now Patent No. 2,713,832; and the mounting for an engine-driven generator is shown in the copending application of Albert G. Dean, Serial Number 119,636, filed October 5, 1949, now Patent No. 2,637,278. In the present application some portions of the structure and equipment of these other applications will be shown in part to illustrate the environment or setting of the present invention. When the present generator and mounting are used on the self-propelled car, referred to, it serves to provide car unit electric current supply when the car is being used in a train pulled by a locomotive, as it is intended to be used at times, and its own power unit and engine-driven generator are not operating. The engine-driven generator will not be eliminated; there will simply be two generators on the car which, when the car is being driven under its own power, may operate together or with one disconnected from the current output circuit of the car. It is to be understood that the generator mounting is not to be limited to the specific environment in which it has been embodied but is, in certain aspects, adapted to be used for other cars and other trucks and the generator may be mounted on the inboard end of the truck when there is available space at that end for it.

One of the specific objects of the invention is to provide a mounting for a generator on a truck which will cushion the shocks on the generator and its supports so as to prolong the life in use.

Another object is to provide a generator mounting which will not impose undue loads on the truck frame in road weave such as might injure the frame.

Another object is to provide a generator mounting which will furnish full clearance under the center sill and draft gear for turning and pitching movements of the truck.

The above and other objects and advantages of the invention will be apparent from the following description of an exemplary embodiment, reference being made to the accompanying drawings thereof, wherein:

Fig. 1 is a side elevation of a railway car carrying a truck-mounted generator according to the present invention;

Fig. 2 is an enlarged side elevation of the truck and related car parts shown at the right side of Fig. 1, the truck having a generator mounted thereon;

Fig. 3 is an enlarged elevation of a portion of the right hand end of the truck shown in Figs. 2 and 6, the view being taken on the line 3—3 of Fig. 6;

Fig. 4 is a transverse vertical section and elevation taken on the line 4—4 of Fig. 2;

Fig. 5 is a partial vertical transverse section taken on the line 5—5 of Fig. 3; and Fig. 6 is an enlarged top plan view of the truck.

In the arrangement shown in the drawings a car 10 is provided with wheel trucks 11 having wheels 12, axles 13, equalizer beams 14, and a truck frame 15. At least one axle and one pair of wheels thereon for each truck is provided with a drive shaft 18 which is driven by a prime mover 19, such for example, as a diesel engine. At least one of the engines 19, as through an inboard auxiliary shaft 20, drives a generator-compressor unit, as more fully disclosed in the application of A. G. Dean, Serial Number 119,636.

The car frame includes a center sill 23, draft gear 24 at each end, a heavy cross-bearer 25 over the king pin 26 of each truck, and floor cross beams 27.

As shown in the plan view, Fig. 6, the truck frame 15 comprises longitudinal side members 15a and transverse members or transoms 15b. A bolster 30 which carries the king pin 26 is supported from a plank 31 and springs 32 thereon from swing hangers 33 carried by the transoms 15b. The side members 15a of the truck frame project at each end beyond the transoms 15b and carry the depending pedestal guides 34 at these free ends for the axle journal boxes 35.

The truck frame is described thus specifically to bring out the fact that the projecting ends of the truck frame side members are free of rigid cross connections and as the generator mounting is described it will be apparent that it leaves these projecting ends free of rigid transverse connections which might place undue strains upon the frame in road weave.

According to the present invention the auxiliary generator 40 is mounted on the outboard end of one of the truck frames and at one side of the car center sill 23 and draft gear 24. Specifically, the generator mount includes longitudinally extending brackets 41 which are secured to the side members 15a of the truck frame, as by bolts 42, and a transverse beam 43, here made tubular, which is supported in bearings 41a on the brackets. Sleeves or bushings 44 of elastic resilient material, such for example as rubber, are interposed between the round journal ends of the transverse beam 43, a thrust flange 44a being provided on each rubber sleeve 44 to fit between a flange 41b of the bracket 41 and a flange 43a of the transverse beam. This flanged elastic sleeve provides a resilient mount for the generator and at the same time avoids rigidification of the truck frame to any material extent.

It will be noted, especially from Fig. 4, that the transverse beam 43 is bent down in the middle sufficiently to clear the center sill and related parts when the truck turns about its king pin and also when it pitches in travel.

The generator is mounted beneath the cross beam 43, as on a bracket 47 carried by depending arms 48 which are secured to the cross beam 43 in any suitable manner, as by welding. The generator is driven by a belt 49, comprising a plurality of separate V-strands, as is now common, from a pulley 50 carried by an axle 13, the generator having a shaft pulley 51 for the belt.

Means are provided for keeping the belt tight, the means shown comprising an adjusting rod 54 pivoted by a pin 55 at one end to a member 56 bolted to the adjacent pedestal guide and the rod 54 being threaded through a hole in the flange 57 of a lateral member carried by the generator supporting bracket. Nuts 58 and lock nuts 59 threaded on the rod 54 provide the adjustment. Resilient elements, such as rubber sandwiches 60 on the rod 54 at each side of the bracket flange 57, are provided to soften shocks on the generator and its support. There are more rubber thicknesses on the belt tightening side of the flange, five being shown, than on the other side, two being shown.

The generator is so mounted that its shaft axis is parallel with an axis drawn through the two journal ends of the supporting cross beam 43 so that the generator shaft axis revolves truly around the beam axis in all adjusting and swinging movements in service.

It is thus seen that a generator mounting is provided which minimizes shock on the generator and strain on the truck frame, which avoids interference with the center sill and related parts, which is clear of other equipment under the car, and which places the generator near the outer side of the car where it is readily accessible for inspection and belt adjustment. And the mounting is very simple and inexpensive.

While one embodiment of the invention has been described for purposes of illustration, it is to be understood that there may be various embodiments within the general scope of the invention.

What is claimed is:

1. A generator support for mounting a generator on an inherently flexible truck frame without materially rigidifying the truck frame, comprising in combination with a truck frame having longitudinally projecting side members, carrying depending pedestal guides for the ends of a wheel axle carried by the truck frame, a longitudinally extending mounting bracket secured to each side member, a transverse mounting beam turnably carried in elastic bushings in bearings on said brackets, said beam being bent down in the center to clear parts, such as center sill and draft gear of the rail car mounted on the truck, a generator mounted on a bracket suspended beneath said beam and having its shaft axis parallel with the turning axis of said beam, a belt carried by pulleys on the generator shaft and an axle carried by the truck frame, and resilient adjustable means between the generator supporting bracket and a pedestal guide of a frame side member.

2. A generator support for mounting a generator on an inherently flexible truck frame without materially rigidifying the truck frame, comprising in combination with a truck frame having longitudinally projecting side members, carrying depending pedestal guides for the ends of a wheel axle carried by the truck frame, a longitudinally extending mounting bracket secured to each side member, a transverse mounting beam turnably carried in elastic bushings in bearings on said brackets, said beam being bent down in the center to clear parts, such as center sill and draft gear of a rail car mounted on the truck, a generator mounted on a bracket suspended beneath said beam and having its shaft axis parallel with the turning axis of said beam, a belt carried by pulleys on the generator shaft and an axle carried by the truck frame, and resilient adjustable means between the generator supporting bracket and a pedestal guide of a frame side member, said generator bracket and generator being supported on said beam at one side of its center and the adjustable means for the generator bracket being located adjacent the vertical plane of a frame side member.

3. A generator support for mounting a generator on an inherently flexible truck frame without materially rigidifying the truck frame, comprising in combination with a truck frame having longitudinally projecting side members, carrying depending pedestal guides for the ends of a wheel axle carried by the truck frame, a longitudinally extending mounting bracket secured to each side member, a transverse mounting beam turnably carried in elastic bushings in bearings on said brackets, said beam being bent down in the center to clear parts, such as center sill and draft gear of a rail car mounted on the truck, a generator mounted on a bracket suspended beneath said beam and having its shaft axis parallel with the turning axis of said beam, a belt carried by pulleys on the generator shaft and an axle carried by the truck frame, and resilient adjustable means between the generator supporting bracket and a pedestal guide of a frame side member, said resilient adjusting means comprising a threaded adjusting rod pivoted to a part secured to a pedestal guide and having a plurality of elastic washer elements interposed between parts on the rod and a part on the generator support.

4. A generator support for mounting a generator on a truck frame, comprising in combination with a truck frame having side members and depending pedestal guides for a wheel axle, a longitudinally projecting part carried by each side member of the truck frame, a turnable cross beam carried at its ends in resilient elastic elements on said longitudinally extending parts, a generator mounted on said cross beam so as to be swingable on and beneath it, a belt operating on pulleys on the generator shaft and an axle, and resilient means between the generator mount and a pedestal for adjusting the tension on said belt.

References Cited in the file of this patent
UNITED STATES PATENTS

| | | |
|---|---|---|
| 1,148,551 | Thomson | Aug. 3, 1915 |
| 1,241,492 | Bouché | Oct. 2, 1917 |
| 1,987,753 | Schmidt | Jan. 15, 1935 |